United States Patent [19]
Simmers

[11] 3,815,492
[45] June 11, 1974

[54] SHEAR AND HOLD DOWN DEVICE
[75] Inventor: Charles F. Simmers, Canfield, Ohio
[73] Assignee: Mayer Pollock Steel Corporation, Pottstown, Pa.
[22] Filed: Jan. 16, 1973
[21] Appl. No.: 324,229

[52] U.S. Cl................ 100/95, 83/458, 83/461, 83/923, 269/25
[51] Int. Cl.............................. B30b 9/32
[58] Field of Search............ 83/923, 390, 389, 458, 83/459, 460, 461, 465; 100/94, 95, 98 R, 233, 269 R; 144/242 K; 269/221, 151, 25, 31

[56] References Cited
UNITED STATES PATENTS

| 590,041 | 9/1897 | Guild | 83/458 X |
|---|---|---|---|
| 2,400,685 | 5/1946 | Collins | 100/269 R |
| 2,955,529 | 10/1960 | Marble | 100/233 X |
| 2,971,547 | 2/1961 | Voges et al. | 144/242 K |
| 3,141,401 | 7/1964 | Lindemann et al. | 100/98 R |
| 3,387,523 | 6/1968 | Pray | 83/461 |
| 3,645,159 | 2/1972 | Chazen | 83/923 |

FOREIGN PATENTS OR APPLICATIONS
35,954  10/1966  Finland ................ 100/95

Primary Examiner—J. M. Meister
Attorney, Agent, or Firm—Webster B. Harpman

[57] ABSTRACT

A shear and hold down device are arranged in side by side relation on a common base, the shear having a single alligator jaw and a hydraulic cylinder for actuating the same. The hold down device includes a frame spanning the area adjacent the shear and having a movable clamping bar positioned therein for movement by a pair of pivoted hydraulic piston and cylinder assemblies arranged to move the clamping bar into engagement with any object therebeneath so as to hold the same immediately adjacent the shear blade. Guide means on the opposite side of the shear blade prevent movement of the shear blade away from the hold down clamping bar.

7 Claims, 5 Drawing Figures

SHEAR AND HOLD DOWN DEVICE

BACKGROUND OF THE INVENTION

1. Field of the Invention:

This invention relates to hydraulic shears and hold down devices for use therewith as employed in cutting metal scrap for example large steel sections of columns and beams and integral and/or separate automobile bodies and frames and other large metal pieces.

2. Description of the Prior Art:

Shears with hold down devices may be seen in U.S. Pat. Nos. 3,387,523, 3,090,270, 3,165,960 and 3,152,499. This invention discloses an improved shear and hold down device wherein the hold down device is capable of engaging objects of unusual size and shape and exerting crushing pressures thereon and holding them so as to prevent sideward movement of the shear blade.

SUMMARY OF THE INVENTION

A shear and hold down device comprising an adjacently mounted hydraulically actuated guided shear and a vertically movable hold down device arranged for crushing and holding metal articles immediately adjacent the shear so as to facilitate shearing thereof and being capable of moving to various positions to accommodate the shape of the article being crushed and/or held down for shearing.

DESCRIPTION OF THE PREFERRED EMBODIMENT

Figure 1:
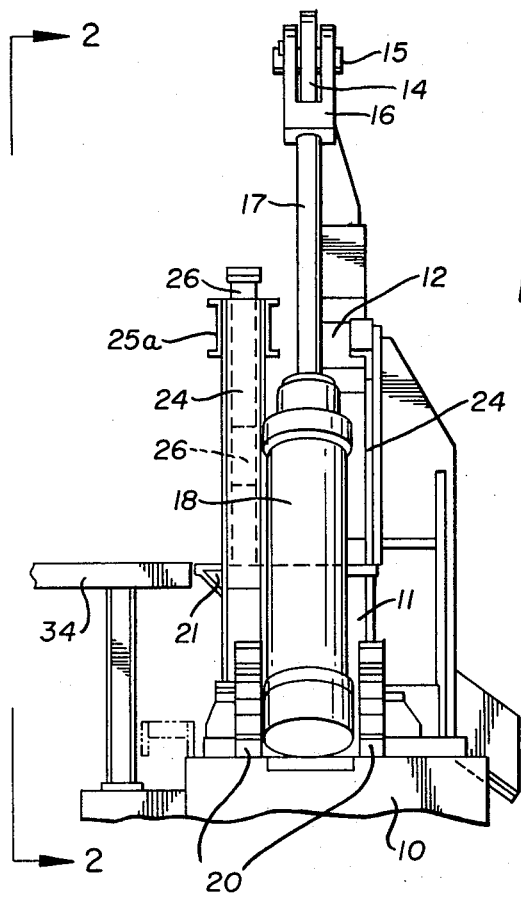
FIG. 1 is a side elevation of the shear and hold down device.
Figure 2:
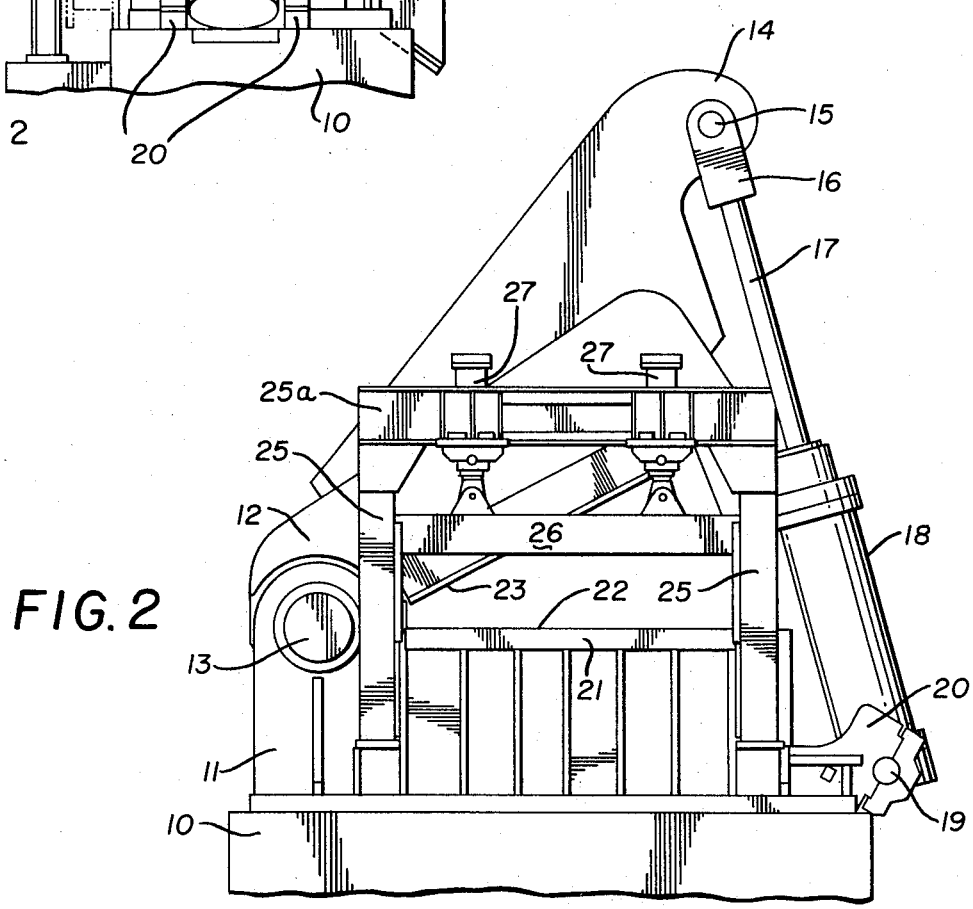
FIG. 2 is a front plan view of the shear and hold down device taken on line 2—2 of FIG. 1.
Figure 3:
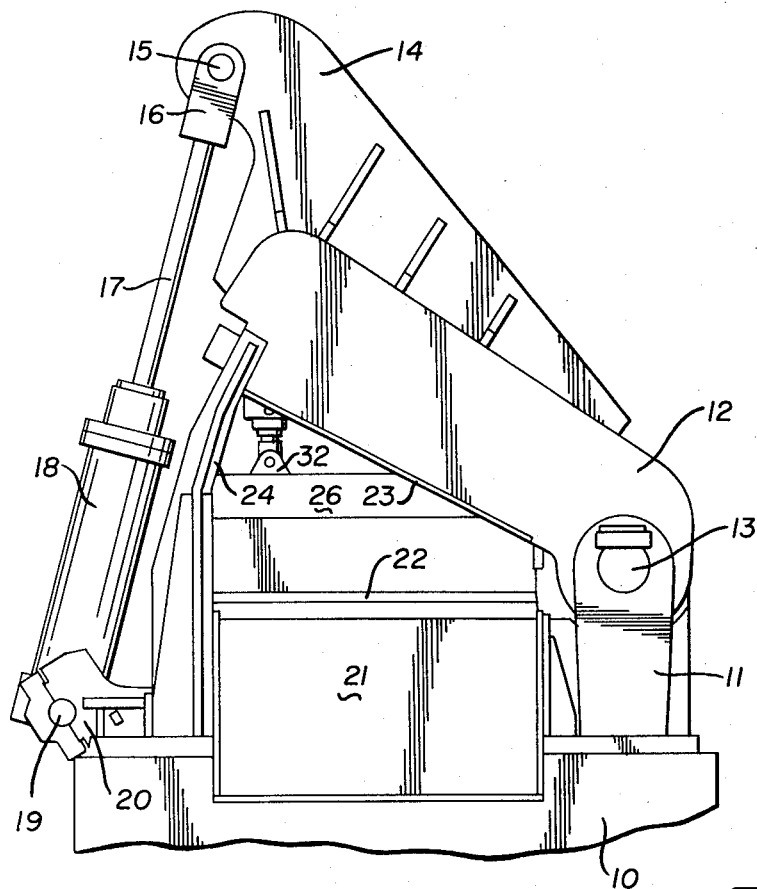
FIG. 3 is a back plan view of the shear and hold down device.

In the form chosen for illustration the shear and hold down device as may be seen in FIGS. 1, 2 and 3 of the drawings, comprises a base 10 on which a shear supporting stand 11 is positioned and arranged to pivotally mount a shearing arm 12 as by a pivot structure 13. The pivot structure 13 engages one end of the shearing arm 12 and the other end is provided with an upward and outward extension 14 which is pivotally attached by a pin 15 to a bifurcated end 16 of a piston rod 17 which in turn is part of a hydraulic piston and cylinder assembly 18. The cylinder of the hydraulic piston and cylinder 18 is pivotally mounted as at 19 between cylinder supports 20 which are positioned on the base 10 at the opposite sides thereof with respect to the stand 11.

A shear table 21 is positioned on the base therebetween and has one edge defined by a fixed shear blade 22. The fixed shear blade 22 is positioned for shearing engagement with a movable shear blade 23 positioned on and carried by the shearing arm 12 which is pivoted to the stand 11.

Means is provided for insuring the desirable arcuate travel of the shearing arm 12 and consists of an arcuate guide 24 positioned adjacent the shearing arm 12 and in sliding engagement therewith to prevent movement toward the back side of the shear. The arcuate guide 24 is positioned on the base 10 adjacent the cylinder supports 20 heretofore referred to. In order that the shearing arm 12 will not move away from the arcuate guide 23 when performing a shearing operation a hold down device is provided for engaging the material to be cut adjacent the fixed shearing blade 22 and above the table 21.

The hold down device consists of an inverted U-shaped frame 25, the sides of which define channels slidably mounting a crushing and hold down bar 26 and the upper transverse portion of which positions and supports movable piston and cylinder assemblies 27, the piston rods of which are pivotally engaged on the crusher and hold down bar 26.

Figure 5:
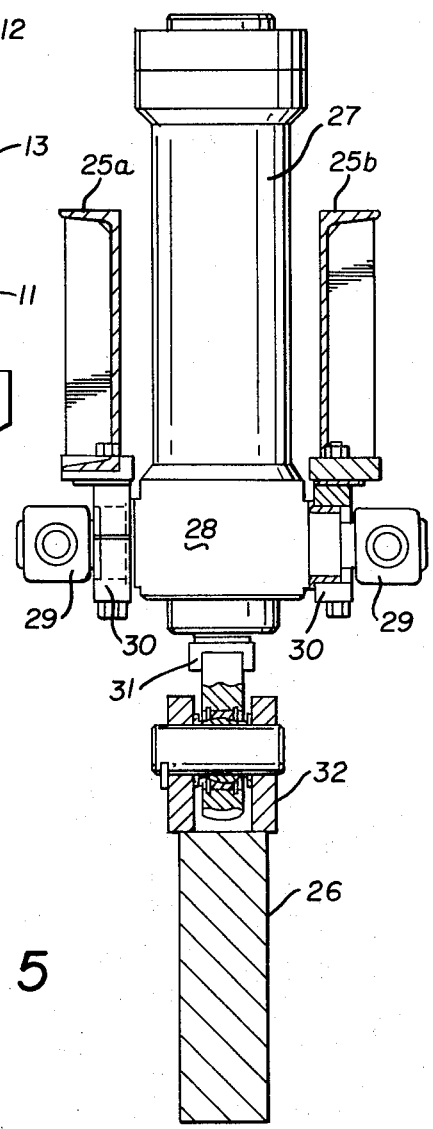
FIG. 5 is an enlarged cross section on line 5—5 of FIG. 4.

By referring now to FIG. 5 of the drawings, pivotal mounting of the cylinders 27 may be seen. The hydraulic cylinders 27 are positioned between frame members 25a and 25b and supported by collars 28 having extending pivot members 29 on the opposite sides thereof which are journeled in depending pivot brackets 30 positioned on the frame members 25a and 25b respectively.

Still referring to FIG. 5 of the drawings it will be seen that the piston rods 31 of the hydraulic cylinders 27 are provided with apertured lower end portions which are positioned between and pivoted to bifurcated brackets 32 on the crusher and hold down bar 26.

Figure 4:
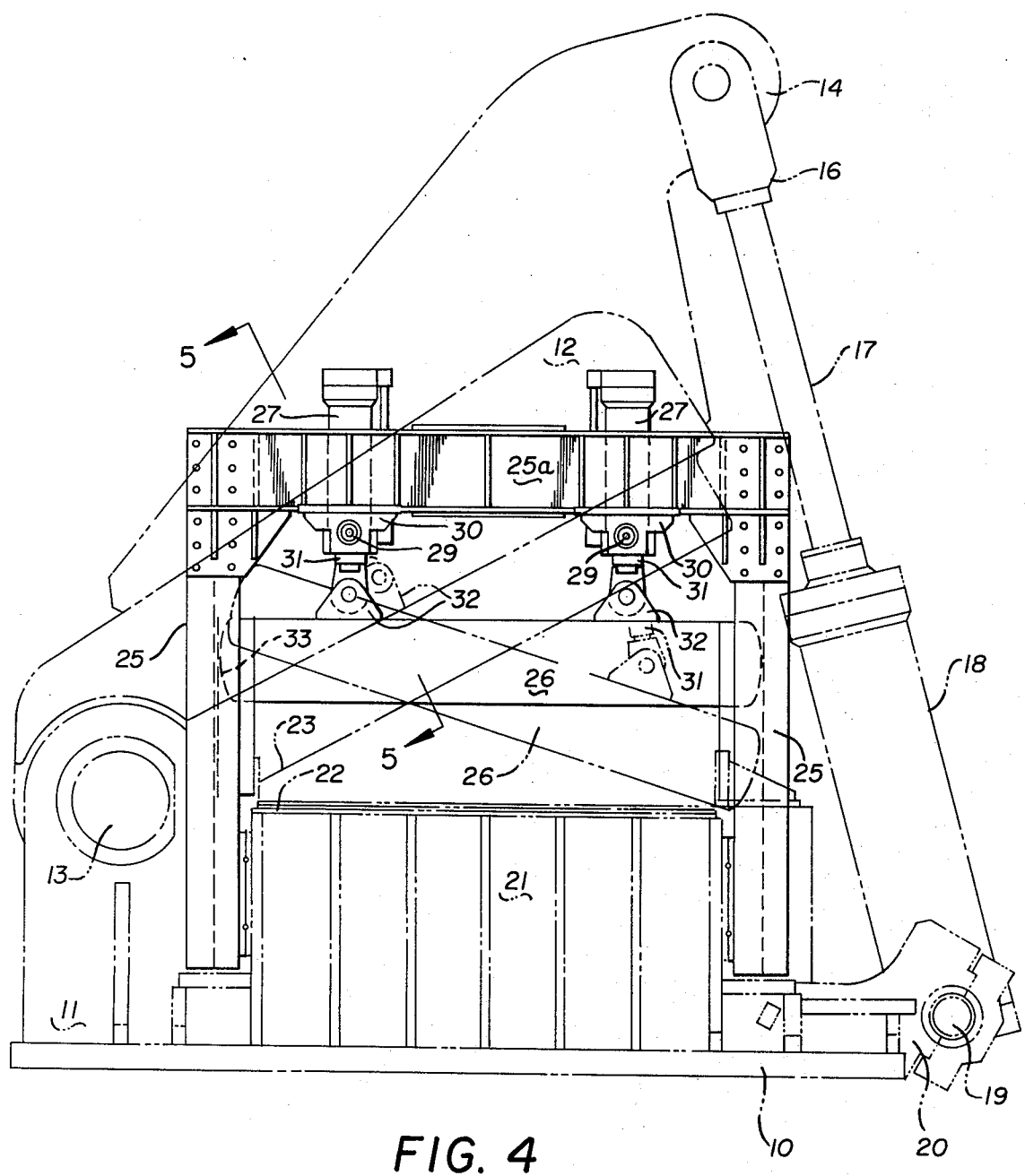
FIG. 4 is an enlarged detailed front plan view of the shear and hold down device with broken lines illustrating portions thereof and alternate locations of the hold down device.

Broken lines in FIG. 4 of the drawings illustrate an alternate position of the crushing and hold down bar 26 and those skilled in the art will observe that the pivotal mounting of the hydraulic piston and cylinder assemblies 27 permit the crushing and hold down bar 26 to assume any necessary attitude upon contacting a metal article to be held down and/or crushed and held down adjacent the shear blade 23.

By referring to FIG. 1 of the drawings, the close association of the crushing and hold down bar 26 and the arcuate guide 24 may be seen and it will be observed that the shearing arm 12 and its shear blade 23 are thereby confined to movement in a desirable arcuate path based on the shearing arm mounting pivot 13 heretofore described.

By referring now to FIG. 4 of the drawings, it will be seen that the crushing and hold down bar 26 has curved end sections 33 and that said curved end sections 33 thereof are slidably engaged in channels defined by the vertical sections of the inverted U-shaped frame supporting the hold down device. The arrangement is such that regardless of the transversely straight or transversely angular position assumed by the crusher and hold down bar 26 the ends thereof remain in the guide channels to prevent unwanted motion which contributes to the successful holding of an article being sheared.

Those skilled in the art will observe that a source of fluid pressure is necessary for actuating the hydraulic piston and cylinder assemblies 18 and 27. The hydraulic piston and cylinder assemblies 18 and 27 are double acting and thereby capable of moving the shear arm 12 and the crushing and hold down bar 26 as desired.

By referring again to FIG. 1 of the drawings, it will be seen that an end portion of a conveyor 34 is positioned alongside the table 21 of the device so that metal articles to be sheared may be continuously fed into the same.

OPERATION

In operating the device of the invention the hydraulic piston and cylinder 18 is moved to open position as seen in FIGS. 1 – 3 of the drawings in solid lines and in broken lines in FIG. 4 of the drawings and whereby the shearing arm 12 and the movable shear blade 23 thereon are opened with respect to the fixed shear blade 22. A metal article to be cut is then fed into the hold down device as by the conveyor 34 and if necessary the hold down device moved vertically successively to crush the article to be cut so that the same can be moved in under the crushing and hold down bar 26 when the same is in elevated relation. The article to be cut is positioned between the shear blades 22 and 23, the hold down device again actuated to bring the crushing and hold down bar 26 into engagement with the article and the hydraulic piston and cylinder 18 energized to move the shearing arm 12 and its blade 23 downwardly in an alligator jaw action relative to the fixed blade 22 whereby the metal article is cut. The hydraulic piston and cylinder assembly 18 is then reversed to move the shearing arm 12 and the blade 23 thereon to open position, the hold down device released with respect to the metal article being held and the same repositioned for a subsequent cutting operation and the cycle repeated until the article is cut into the desired sections.

Those skilled in the art will observe that the hold down device and its novel crushing and hold down bar 26 and actuating means therefor make it possible to progressively move, crush and shear various metal articles which have heretofore required manual labor and cutting torch operations in reducing the same to usable scrap metal.

Although but one embodiment of the present invention has been illustrated and described it will be apparent to those skilled in the art that various changes and modifications may be made therein without departing from the spirit of the invention.

I claim:

1. In a shear and hold down device which comprises a support and a table thereon, a stationary shear blade mounted on said table, a shear arm pivotally mounted on said support adjacent said table, a shear blade on said shear arm for cooperation with said stationary shear blade and means for moving said shear arm; means for engaging articles on the table to crush and hold the same in position for shearing, said means including a vertically disposed frame having spaced vertical channel defining portions and a horizontally disposed elevated portion, a bar positioned in said channel defining portions of said frame for vertical movement relative thereto and means on said elevated portion for imparting vertical movement to said bar, said means on said elevated portion consisting of piston and cylinder assemblies and means on said elevated portion pivotally supporting said piston and cylinder assemblies with respect thereto arranged to permit said piston and cylinder assemblies and said bar to assume various angular positions relative to said elevated portion and said table as determined by an article on said table engaged by said bar while said bar is being moved by said piston and cylinder assemblies and a source of fluid pressure in communication with said piston and cylinder assemblies.

2. The shear and hold down device of claim 1 and wherein said means for imparting movement to said bar consists of a pair of hydraulic piston and cylinder assemblies and said means pivotally supporting said piston and cylinder assemblies consists of collars on said cylinders and pivot members engaging said collars and said elevated portion of said frame and arranged with the pistons having rods in depending relation and pivot means at their lower ends engaging said bar.

3. The shear and hold down device of claim 2 wherein said piston and cylinder assemblies are spaced with respect to one another and the piston rods are pivoted to said bar at spaced points thereon.

4. The shear and hold down device of claim 1 and wherein said spaced channel defining portions are positioned at the opposite sides of said table and attached thereto.

5. The shear and hold down device of claim 1 and wherein said spaced channel defining portions are at the sides of said table, and said bar is positioned with its ends in said channels for guided movement therein.

6. The shear and hold down device of claim 1 and wherein said bar has arcuately shaped ends.

7. The shear and hold down device of claim 1 and wherein said spaced channel defining portions of said frame have vertical guide means and said bar is slidably engaged in said guide means so as to limit motion of said bar toward and away from said guide means so as to retain the respective ends of said bar in engagement in said channel portions while said bar changes position relative to an article on said table and moves relative thereto.

* * * * *